(No Model.) 2 Sheets—Sheet 1.

D. McINTOSH.
FRICTION CLUTCH.

No. 260,698. Patented July 4, 1882.

Witnesses:

Inventor: David McIntosh
By H. L. Perrine, Atty.

(No Model.) 2 Sheets—Sheet 2.
D. McINTOSH.
FRICTION CLUTCH.
No. 260,698. Patented July 4, 1882.
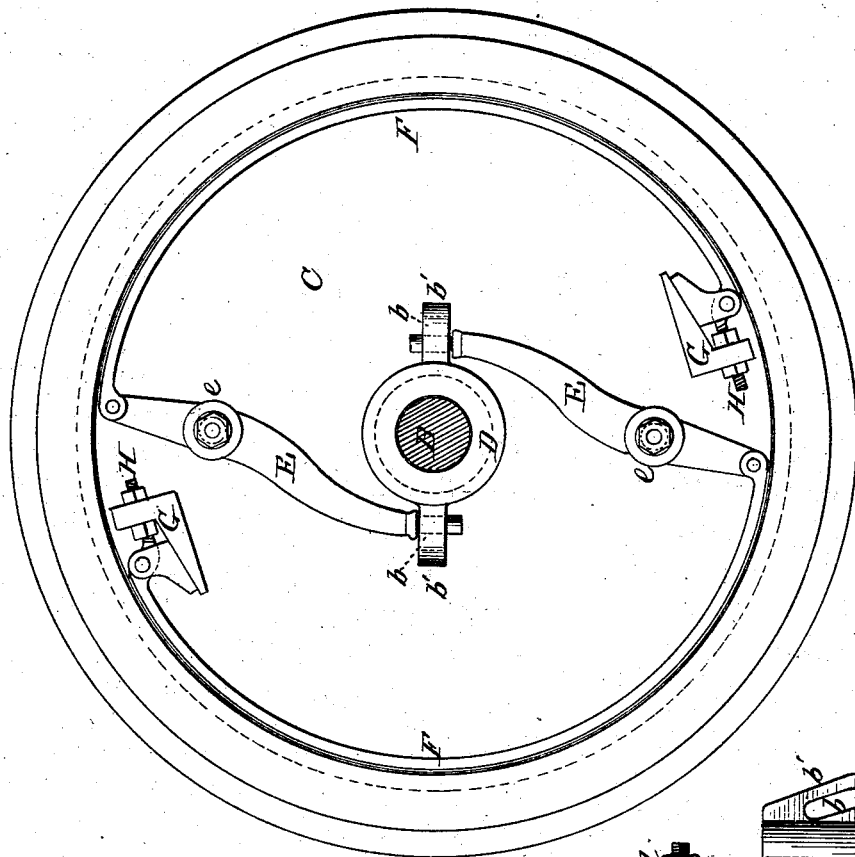
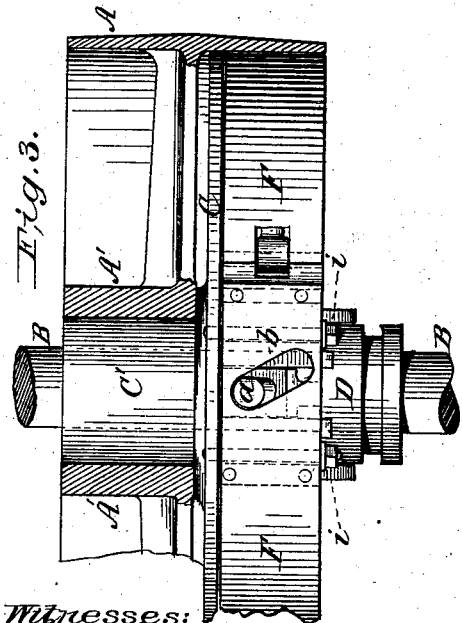
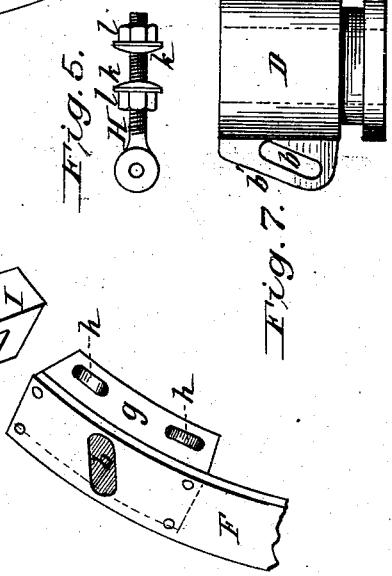
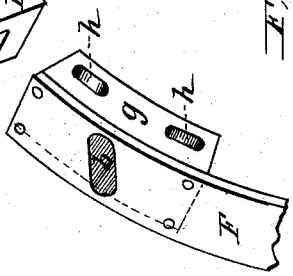
David McIntosh
Inventor.
By H. L. Perrine,
Atty.
Witnesses:

UNITED STATES PATENT OFFICE.

DAVID McINTOSH, OF DENVER, COLORADO.

FRICTION-CLUTCH.

SPECIFICATION forming part of Letters Patent No. 260,698, dated July 4, 1882.

Application filed May 15, 1882. (No model.)

*To all whom it may concern:*

Be it known that I, DAVID McINTOSH, a citizen of the United States, residing at Denver, in the county of Arapahoe and State of Colorado, have invented certain new and useful Improvements in Friction-Clutches for Pulleys and Hoisting-Engines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in friction-clutches for controlling the motion of band-pulleys or drums for the transmission of power in hoisting-engines, for mining and other purposes, and the objects of my improvements are to relieve the shaft of end-thrust in applying the clutch, and to render the clutch effective and durable. These objects are attained by the clutch illustrated in the accompanying drawings, in which—

Figure 2:
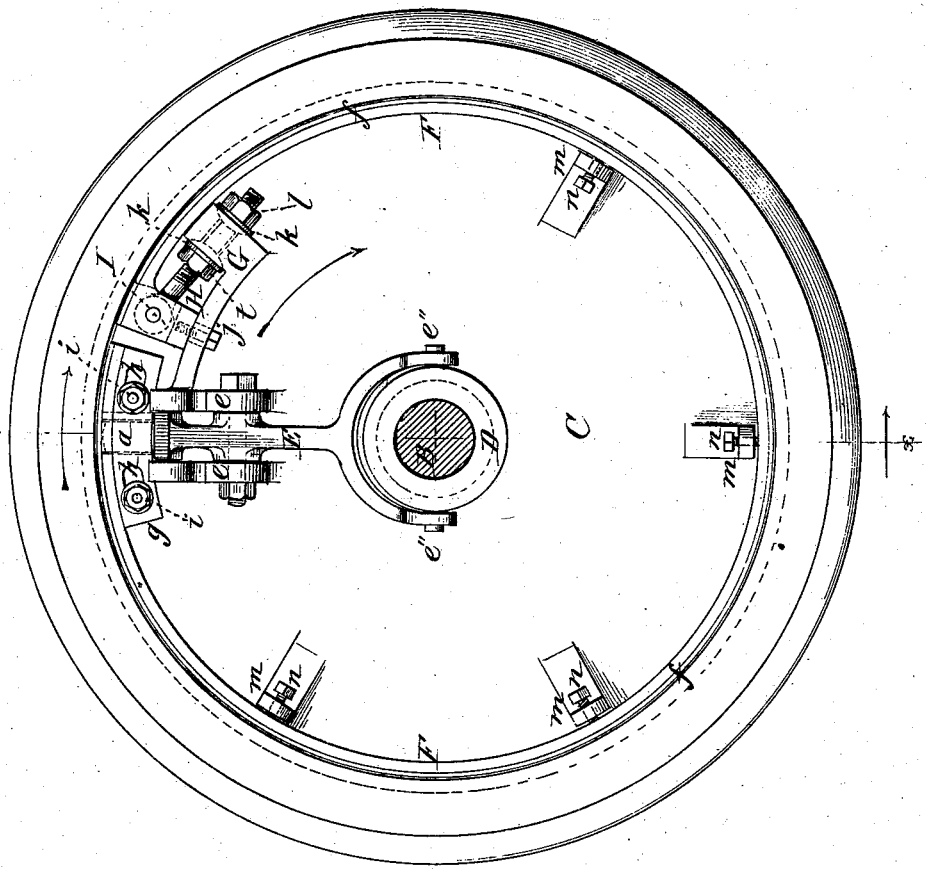
Figure 7:
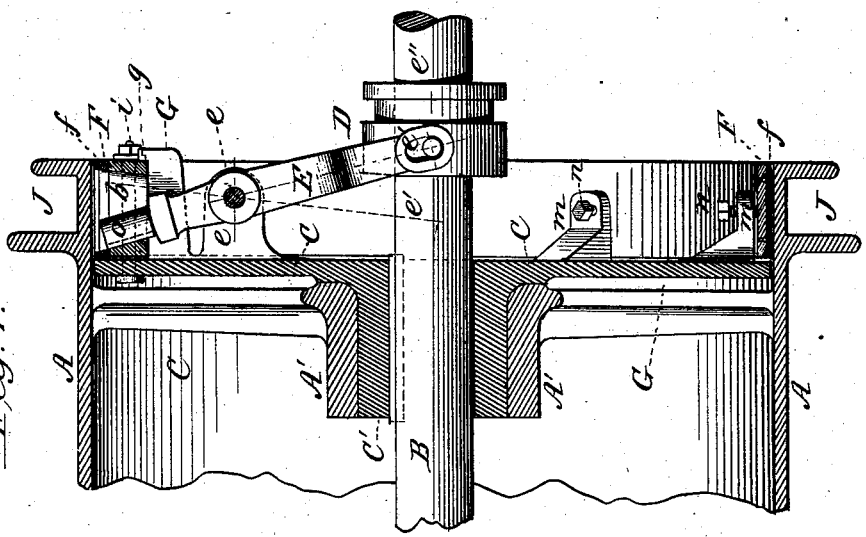

Figure 1 represents a diameter-section on the line $x\,x$ of Fig. 2, showing the clutch-operating parts out of action with the loose pulley or drum; Fig. 2, a front face view of the same, showing the arrangement of a single lever pivoted to the clutch-disk and connected to one end of the friction strap or band for controlling its application to and release from the loose drum; Fig. 3, a partial section of a pulley, showing the acting surface of the friction-band, and the oblique opening therein to receive the end of the operating-lever; Fig. 4, the ends of the single friction strap or band, showing one end re-enforced by a riveted block and the oblique groove therein to receive the end of the lever by which motion is imparted to said friction strap or band. Fig. 5 shows the bolt, screw-nuts, and convex washers by which one end of said friction-band is secured to the clutch-disk. Fig. 6 represents a modification of the clutch, showing the arrangement of two separate levers, their pivoted connection with the clutch-disk and with separate friction-straps; and Fig. 7 shows the oblique slotted sliding collar by which the two levers shown in Fig. 6 are operated to apply and release the friction-straps.

The drum or pulley A is loose upon the shaft B, which constantly revolves, and the disk C is keyed to the shaft and forms the driver for the drum or pulley. A collar, D, turns loose upon the shaft, and has also a limited horizontal movement thereon by means of a clutch-lever, not shown, but well known in clutches of this kind. A lever, E, pivoted to the studs $e$, cast on the outer face of the disk C, has its inner forked end provided with slots $e'$, by which it is connected with pins $e^2$, projecting from the sliding collar. The outer end of this lever forms a cylindrical pin, $a$, adapted to fit within a slot, $b$, formed obliquely across the friction-band F, near one of its ends, as shown in Fig. 3. The other end of the friction-band is adjustably connected by a lug, G, to the drum-driving disk C at a point near the lever connection with said band. The direction of the slot $b$ is oblique to the axis of the shaft, as shown in Fig. 3, and the friction-band lies within and contiguous to the rim of the pulley or drum and against the disk.

The position of the operating-lever is radial when a single lever is used, and a horizontal movement of the collar D upon the shaft toward the disk C will vibrate the lever E and cause its outer end to be moved from the disk C in a direct line at right angles to it within the oblique slot $b$ of the friction-band, and thereby force said band out hard against the inner side of the drum-rim, thus causing the drum to be revolved with the shaft, because the lever and its connected disk are continually revolving with the shaft. In Figs. 1 and 3 the reverse of this position and action of the lever is shown, by which the friction-band is released from drum or pulley rim to stop the motion of the drum or pulley. In effecting this action the lever acts against the walls of the oblique slot $b$ upon the principle of a wedge to effect the contraction or expansion of the friction ring-band. This action of the lever is positive, and is limited by the length of the oblique slot $b$, which also limits the extent of the horizontal movements of the collar D toward and from the disk, while the slotted connection of the lever with the collar allows its free movement therewith.

The lever E being radial, its movement is toward and from the face of the disk; but the action of the lever upon the band is at right angles to the shaft, thus producing little end-thrust upon the shaft in applying the revolving friction-band to the non-revolving drum. The pivot of the lever is preferably nearer the outer than the inner end, so as to give the best movement to its outer end in applying and releasing the friction-band. The friction-band is faced with leather $f$ or other suitable material. Its slotted end is re-enforced by a block, $g$, riveted to it and provided with slots $h$, through which screw-bolts $i$ pass, whereby to confine the said slotted end of the friction-band to the disk, so that it may be held to the disk while being moved by the lever upon the confining-screws, as shown in Fig. 2. The other end of the friction-band is fastened to the disk-lug G by a screw, H, pivoted to a slotted end, I, of said band and passing through said lug. This end of the friction-band terminates in a slotted block, I, to which the screw H is pivoted, and which is also fastened to the lug G by a screw, $j$, passing through a slot in the lug.

The set-screw H has convex washers $k\ k$ on each side of the lug and screw-nuts $l\ l$ binding the washers to the lug. By this construction the friction-band can be properly adjusted, and the convex washers seated in the opposite faces of the unthreaded lug allow of such adjustment with regard to the proper relation of the friction-band to the pulley-rim and to the secondary fastening-screw $j$.

The friction-band is prevented from buckling by brackets $m$, cast on the disk at suitable intervals, and provided with set-screws $n$, adapted to support upon their points the friction-band in proper relation to the pulley-rim.

The lugs $e\ e$, to which the lever is pivoted, are extended so as to support it against the thrusts of the friction-band in connecting the disk fixed upon the revolving shaft with the non-revolving drum loose upon the shaft.

The disk C has a hub-bearing, C', and the drum or pulley has a sleeve-hub, A', cast with spokes adapted to fit and revolve upon the said disk hub bearing, while a grooved circumferential projecting rim, J, is formed around the end of the drum to receive a brake-strap for use in lowering a load or allowing the drum to run loose upon the shaft, as shown in Fig. 1.

In the modification shown in Fig. 6 the principle of action of the oblique slot $b$ is transferred from the friction-band F to the sliding collar D, with an arrangement of two levers and a friction-band of two sections, each section being connected with and operated by the separate levers. In this arrangement the collar D has arms $b'\ b'$ projecting from its opposite sides, and the oblique slots for the levers are formed therein, diverging outward from the shaft, as shown in Fig. 7. The outer end of each lever is pivoted to one end of each friction-band section whose other end is adjustably connected by a lug, G, and set-screw H to the drum-driving disk. A horizontal movement of the collar will cause the inner ends of the levers to be moved toward or from the collar, and thereby spread or draw them nearer together at right angles to the shaft. This action of the levers is effected by the oblique relation of the slots to each other and to the axis of the shaft. The spreading action of the levers will cause the friction-bands to be forced hard against the inner side of the drum or pulley-rim, and thus cause the drum to revolve with the shaft. The drawing of the lever ends nearer together will release the binding action of the friction-bands and stop the motion of the drum. The collar D revolves with the lever or levers, the shaft, and the disk.

It will be understood that the slots $h$ allow the sufficient movement of the friction-band over the confining-screws $i$ to expand and contract the band by the action of the lever in the oblique slot.

I claim—

1. The combination, substantially herein described, in a friction-clutch for pulleys and hoisting-drums, of the disk C, fixed on the shaft, the sliding collar D, and a friction-band, F, with a lever, E, pivoted to said disk, having one end connected to one end of the friction-band and the other end to the sliding collar, and operating within an oblique slot in one or in the other connection, whereby the sliding movement of the collar will vibrate the lever by direct connection to apply and release the friction-band.

2. The combination, in a friction-clutch, of the disk C, fixed on the shaft, and the friction-band F, having the crosswise oblique slot $b$ near one end, with a lever, E, pivoted to the disk having one end operating within the crosswise oblique slot of the band, and the sliding collar D, having a slotted connection with the other end of said lever, for operation as set forth.

3. The clutch-band F, having the end re-enforcing block $g$ and the oblique slot $b$ therein, and the set-screw H, pivoted to the other end of said band, in combination with the lever E, its operating-collar D, and the disk C, provided with the lug G, for the pivoted set-screw, the said re-enforced band end $g$ having slots $h$ and confining-screws $i$, substantially as described, for the purpose specified.

4. The combination of the friction-band F with the disk C, having the brackets $m$ and screws $n$, the lever E, connected with the movable end of said friction-band, and the screws $i$ and H, for confining said band to the disk, substantially as described, for the purpose specified.

5. The disk C of the friction-clutch device, having the hub-bearing C', in combination with the drum or pulley having the sleeve A' fitted to revolve upon said hub-bearing, the friction-band, and means for operating it, substantially as herein set forth.

6. The friction-clutch device herein described, consisting of the disk C, the lever E, pivoted to the face of said disk, the friction-band F, having the re-enforcing block $g$ and the oblique slot $b$ at one end and the set-screw H pivoted to the other end, and the sliding collar D, the said friction-band being supported by the bracket-screws $n$ and having its lever-connecting end movably confined to the disk, all constructed and adapted for application to the shaft and to the pulley or drum thereof, substantially as described, for the purpose specified.

In testimony whereof I have affixed my signature in presence of two witnesses.

DAVID McINTOSH.

Witnesses:
I. P. SCHLINT,
JAMES COLVILLE.